Jan. 8, 1957           J. T. FELMLEE           2,776,518

FISH LURE

Filed June 25, 1954

INVENTOR.
JOHN T. FELMLEE
BY
McMorrow, Berman + Davidson
ATTORNEYS 2,776,518

FISH LURE

John T. Felmlee, Lewistown, Pa.

Application June 25, 1954, Serial No. 439,251

1 Claim. (Cl. 43—42.24)

This invention relates to artificial bait, and more particularly to a fish lure of the minnow type.

It is an object of this invention to provide a fish lure which will closely resemble in appearance the living minnow of which it is an imitation and which will accurately and closely resemble the movements of the living minnow, the movements of the lure being selective at the option of the fisherman.

It is a further object of this invention to provide an artificial lure for fishing which is attractive in appearance, effective for the purpose intended, simple and efficient in both operation and manufacture, and which may be operated as a spinner lure.

It is a further and yet another object of this invention to provide a fish lure which will move and turn to provide a realistic action simulating the movement of the minnow which it is a copy of. Also, provisions are made to impart stability to the lure and which will be of proper weight for fishing due to its construction.

Other objects and advantages will become apparent from a consideration of the following detailed description, forming the specification, and taken in conjunction with the accompanying drawing, in which.

Figure 1:
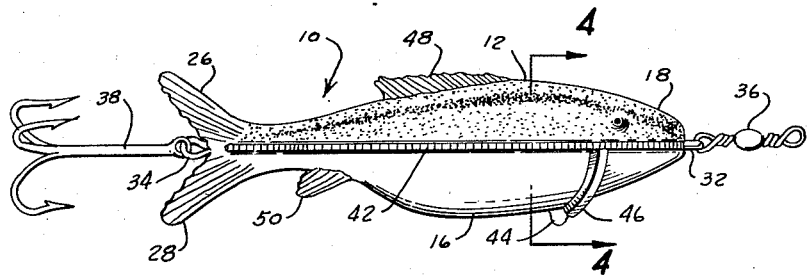
Figure 1 is a side elevational view of the fish lure embodying this invention.

With continued reference to the drawings, there is shown a fish lure, generally indicated at 10 which comprises a body 12 made of a suitable plastic material of deformable character, and which is molded over a lead weight 14 which will thus be embedded within the body 12 in the intermediate portion or section 16 thereof.

The body 12 also includes, aside from the intermediate section 16, a head section 18 provided with a mouth 20 and a tail section 22.

Figure 3:
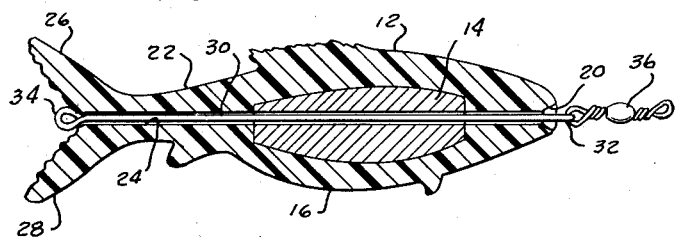
Figure 3 is a longitudinal cross sectional view taken on line 3—3 of Figure 2.

A longitudinal bore 24 is drilled centrally through the body 12 opening at one end at the mouth 20 and at the other end at the juncture of the tail fins 26 and 28 of the tail section 22. The rod 30 extends through the bore 24 and is formed with an eye 32 at one end thereof, the eye 32 being disposed adjacent the mouth 20. A similar eye 34 is formed at the other end of the rod 30 and is disposed externally of the body 12 and at the juncture of the tail fins 26 and 28, as shown in Figure 3.

A swivel 36 has one end thereof secured in the eye 32 and the other end of the swivel is adapted to be attached to a fishing line, not shown. A three-pronged fish hook 38 is secured to the eye 34 of the rod 30 and extends outwardly from the body 12 of the lure.

The body 12 is provided with a pair of longitudinal, laterally extending stabilizer ribs 40 and 42 along its longitudinal medial plane through the body 12. The pair of riblike, arcuately formed lower front fins 44 and 46 are provided on the body 12 adjacent the head section 18 and disposed on opposite sides of the portion of the body 12 below the stabilizer ribs 40 and 42.

Figure 4:
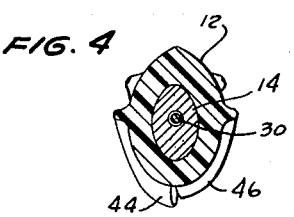
Figure 4 is a vertical transverse sectional view taken on line 4—4 of Figure 1.

With further reference to the lower front fins or ribs 44, 46 it will be observed that these terminate at their upper ends in a direct connection to the longitudinal stabilizer ribs 40, 42 respectively. In being extended downwardly from the stabilizer ribs, the elongated, relatively narrow fins are also extended in a curving path toward the tail end of the lure so that they are in effect extended along spiral paths through one-fourth of the circumference of the body, viewing the same in cross section as in Figure 4. At their lower ends, fins 44, 46 terminate in a vertical plane bisecting the body longitudinally thereof medially between the opposite sides of hte body, with fin 44 having its lower end aft of the lower end of fin 46. The outer surfaces of the fins closely follow the transverse contour of the surfaces of the body on which they are formed, again as best shown in Figure 4.

The body 12 is further provided with a back fin 48 and a lower rear fin 50.

Due to the plastic material from which the body of the lure is molded, coloring which accurately portrays the actual coloring and shadings of the minnow which the lure is to simulate can be realistically reproduced and will result in an appearance far more similar to the living minnow it is to represent than lures now available.

It will be noted, in regard to the lead weight 14, that this weight is so disposed along the longitudinal center line of the body 12 that the center line of the lead weight is disposed to one side of the longitudinal center line of the body, the lead weight 14 will provide proper weight to the lure for fishing as well as providing proper balance therefor.

Figure 2:
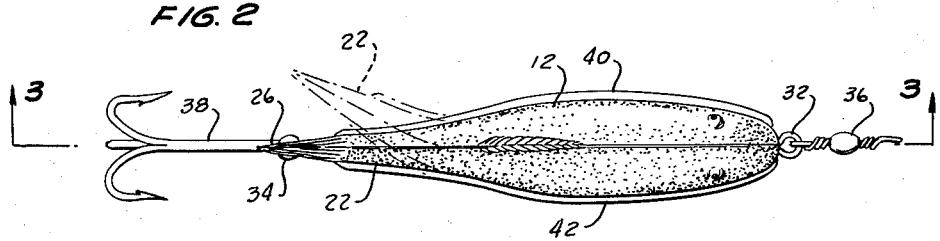
Figure 2 is a top plan view thereof.

Since the lure 10 is connected to a swivel 36, the lure will be of the rotating or spinning type. Due to the plastic material from which the body 12 is molded, the tail section 22 may be deformed, as by manual pressure, so as to move the tail section laterally out of alignment with the longitudinal axis of the body 12, as shown in broken lines in Figure 2, to thereby impart a spin or wobble motion to the lure as it is pulled through the water. The degree of deformation of the tail section is selective at the option of the fisherman, the greater the deformation, the greater the amount and degree as well as the speed of the resulting spinning motion as the lure is pulled through the water. Thus, the fish lure 10 has a tail section which is selectively deformable at the option of the fisherman to provide a spinning lure, the speed of rotation or wobble of which may be selectively predetermined.

This latter feature will enable a fisherman to employ the fish lure 10 in a variety of fishing operations and under a variety of conditions without recourse to other lures so that this single lure 10 will serve the purpose of a plurality of individual lures of various tail formations. The fins 44 and 46 at the lower front of the body are for the purpose of causing the lure to move and turn and to make a realistic motion as it is drawn through the water. The ribs 40 and 42 are formed integrally with the body 12 and may be conveniently molded therewith, and these ribs are intended to give the lure 10 stability so as to enable the lure to do the work intended faster and better. Thus, the stabilizing ribs 40 and 42 operate in connection with the lead weight 14 and the deformable tail section 22 to impart a life-like and realistic movement to the lure 10 while the material from which the body 12 of the lure is molded is colored and shaded so as to almost exactly duplicate the minnow which it is to simulate.

From the foregoing, it will be apparent that there has been provided a fish lure which comprises a molded plastic body 12 having a longitudinal bore 24 therethrough, the body being in the shape of a minnow, the body 12 including a head section 18, an intermediate section 16 and a tail section 22, a rod 30 extends through the bore 24 and a fishhook 38 secured to the rod at one end thereof and extends outwardly from the tail section 22 while a swivel 36 is secured to the rod 30 at its other end and extends outwardly from the mouth 20 of the head section 18, the tail section 22 being selectively deformable to permit movement of the body 12 about the swivel 36 at a desired speed and in a predetermined manner.

While there are shown and described the preferred embodiment of the invention, it is to be understood that the structure is susceptible to change and modification within the practicability of the invention and therefore should be limited only by the scope of the claim appended thereto.

What is claimed is:

A fish lure comprising a molded plastic body having the longitudinal and transverse proportions, fully from end to end thereof, of a live bait fish, said body having a longitudinally and centrally extending bore therethrough and being formed of a readily deformable material, the tail portion of the body by reason of the deformability of said material being bendable laterally with respect to the longitudinal center line of the body to a degree selectable by the user, said body including integral, narrow, longitudinal stabilizer ribs extending fully from the head to the tail end of the body and lying in a common horizontal plane passing through the longitudinal median of the body, the body further including integral front fins spaced rearwardly from the head end of the body and disposed at opposite sides thereof, said fins having one end directly connected to the stabilizer ribs and extending downwardly from the respective stabilizer ribs each through approximately one-quarter of the girth of the body, along paths extending spirally about the body, the lower ends of the fins terminating substantially in a plane perpendicular to said horizontal plane and bisecting the body longitudinally at the longitudinal center line thereof; a weight embedded in the body and having a longitudinal bore registering with the first named bore, the longitiudinal center line of the weight being disposed to one side of the longitudinal center line of the body, said weight having a rear end terminating a substantial distance forwardly of the tail end of the body to avoid hindrance to deformation of said tail end in a lateral direction; and a rod of deformable material extending through said registering bores and formed with eyes beyond the head and tail ends of the body, one eye for receiving a line connector and the other eye for receiving a hook.

References Cited in the file of this patent

UNITED STATES PATENTS

| 967,660 | Pedersen | Aug. 16, 1910 |
| 1,598,786 | Romadke | Sept. 7, 1926 |
| 1,777,004 | Lemere et al. | Sept. 30, 1930 |
| 2,437,549 | Pecher | Mar. 9, 1948 |
| 2,475,101 | Kosash | July 5, 1949 |
| 2,605,578 | Waterton | Aug. 5, 1952 |

FOREIGN PATENTS

| 1,035,123 | France | Apr. 15, 1953 |